(12) United States Patent
Igoe

(10) Patent No.: US 12,044,540 B1
(45) Date of Patent: Jul. 23, 2024

(54) NAVIGATION TERMINATION SYSTEMS AND METHODS

(71) Applicant: Noel Francis Igoe, Bala Cynwyd, PA (US)

(72) Inventor: Noel Francis Igoe, Bala Cynwyd, PA (US)

( * ) Notice: Subject to any disclaimer, the term of this patent is extended or adjusted under 35 U.S.C. 154(b) by 0 days.

(21) Appl. No.: 18/622,918

(22) Filed: Mar. 30, 2024

Related U.S. Application Data

(60) Provisional application No. 63/521,688, filed on Jun. 18, 2023.

(51) Int. Cl.
*G01C 21/36* (2006.01)

(52) U.S. Cl.
CPC .................................. *G01C 21/36* (2013.01)

(58) Field of Classification Search
CPC ...................................................... G01C 21/36
See application file for complete search history.

(56) References Cited

U.S. PATENT DOCUMENTS

| | | | |
|---|---|---|---|
| 10,175,055 B2 * | 1/2019 | Mayrhofer | G01C 21/34 |
| 2011/0246404 A1 * | 10/2011 | Lehmann | G06Q 50/14 |
| | | | 706/21 |
| 2019/0362639 A1 * | 11/2019 | Hosamani | G08G 5/0047 |

* cited by examiner

*Primary Examiner* — Khoi H Tran
*Assistant Examiner* — Aaron G Cain

(57) ABSTRACT

Systems and methods are provided for assisting the navigation function based in part on detection of disconnection from vehicle integration functions by other devices navigating to the same destination, where the disconnections occurred outside of a predetermined boundary associated with the destination.

20 Claims, 11 Drawing Sheets

NAVIGATION TERMINATION SYSTEMS AND METHODS

CROSS-REFERENCE TO RELATED APPLICATIONS

This application claims the benefit of U.S. Provisional Application No. 63/521,688, filed Jun. 18, 2023.

BACKGROUND

In the past, drivers used paper maps to guide themselves to their destinations. Drivers knew when they were done navigating and the paper maps had no mechanism for intruding on the drivers' activities afterwards. Later, built-in or car-attached navigation systems came into use. In those cases, shutting off the vehicle would usually shut off the navigation system or, the navigation system would be left behind in the vehicle. The navigation system, left behind, would also not intrude on the drivers' further activities.

More recently, however, many have begun using their cellular phones for car navigation. Unlike a built-in navigation system, a cellular phone can, and usually does, leave the car with the driver. A common problem when leaving the car when arriving in the vicinity of an intended destination is that the navigation function continues operating on the cellular phone if the driver has not reached a more specific area considered as the destination by the navigation system. This can result in annoying, and sometimes embarrassing, navigation notifications being emitted from the driver's phone, which may be in a pocket or a purse. Then, the driver must take the time to retrieve the phone and manually end the navigation function.

A need exists for systems and methods that more intelligently terminate navigation functions when a driver has generally reached a destination.

SUMMARY OF THE INVENTION

In one embodiment, steps are performed by a mobile device, comprising: receiving, from a first mobile device: information indicating disconnection of the first mobile device from a vehicle integration function of a first vehicle during a navigation operation to a first destination performed by the first mobile device, information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and information regarding a first location associated with the first mobile device at the time of the disconnection of the first mobile device from the vehicle integration function of the first vehicle during the navigation operation to the first destination performed by the first mobile device; receiving, from a second mobile device: information indicating disconnection of the second mobile device from a vehicle integration function of a second vehicle during a navigation operation to the first destination performed by the second mobile device, information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and information regarding a second location associated with the second mobile device at the time of the disconnection of the second mobile device from the vehicle integration function of the second vehicle during the navigation operation to the first destination performed by the second mobile device; responsive to a determination that both of: a) the first location associated with the first mobile device at the time of the disconnection of the first mobile device from the vehicle integration function of the first vehicle during the navigation operation to the first destination performed by the first mobile device, and b) the second location associated with the second mobile device at the time of the disconnection of the second mobile device from the vehicle integration function of the second vehicle during the navigation operation to the first destination performed by the second mobile device are outside of a predetermined first geographic boundary associated with the first destination and are inside a predetermined second geographic boundary associated with a location within a predetermined distance of the first destination: generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device; receiving, from a third mobile device: information indicating disconnection of the third mobile device from a vehicle integration function of a third vehicle during a navigation operation to the first destination performed by the third mobile device, and information regarding the location of the third mobile device at the time of the disconnection of the third mobile device from the vehicle integration function of the third vehicle during the navigation operation to the first destination performed by the third mobile device; and responsive to a determination that the third location is inside the third geographic boundary: sending information to the third mobile device indicating that the navigation function associated with the first destination performed by the third mobile device should be terminated.

In some embodiments, at least one of the first mobile device, the second mobile device, and the third mobile device are cellular phones.

In some embodiments, the vehicle integration functions are one of Apple CarPlay or Android Auto functionality of the vehicle.

In some embodiments, the third location is inside the third geographic boundary but outside the first geographic boundary.

In some embodiments, information indicating manual termination of a navigation operation comprises information regarding the destination associated with the navigation operation.

In some embodiments, the location within a predetermined distance of the first destination comprises at least one of: a business, a residence, a facility, a real estate area, a parking area associated with the first location, a parking area associated with a real estate entity associated with the first location, a municipality, an attraction, or a point of interest.

In another embodiment, the steps further comprise: sending, to a location server, information regarding a location associated with a mobile device at the time of the disconnection of the mobile device from a vehicle integration function of a vehicle, and receiving, from the location server, information regarding one or more locations within a predetermined distance of the first destination.

In some embodiments, any of the first, second, or third geographic boundaries are irregular polygons.

In some embodiments, a navigation management server system comprises: a processor, a transmitter, a receiver, a memory for storing instructions for causing the processor, transmitter, and receiver to perform the steps of: receiving, from a first mobile device: information indicating disconnection of the first mobile device from a vehicle integration function of a first vehicle during a navigation operation to a first destination performed by the first mobile device, information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and information regarding a first location associated with the first mobile device at the time of the disconnection of the first mobile device from the vehicle integration function of the first vehicle during the navigation operation to the first destination performed by the first mobile device; receiving, from a second mobile device: information indicating disconnection of the second mobile device from a vehicle integration function of a second vehicle during a navigation operation to the first destination performed by the second mobile device, information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and information regarding a second location associated with the second mobile device at the time of the disconnection of the second mobile device from the vehicle integration function of the second vehicle during the navigation operation to the first destination performed by the second mobile device; responsive to a determination that both of: a) the first location associated with the first mobile device at the time of the disconnection of the first mobile device from the vehicle integration function of the first vehicle during the navigation operation to the first destination performed by the first mobile device, and b) the second location associated with the second mobile device at the time of the disconnection of the second mobile device from the vehicle integration function of the second vehicle during the navigation operation to the first destination performed by the second mobile device are outside of a predetermined first geographic boundary associated with the first destination and are inside a predetermined second geographic boundary associated with a location within a predetermined distance of the first destination: generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device; receiving, from a third mobile device: information indicating disconnection of the third mobile device from a vehicle integration function of a third vehicle during a navigation operation to the first destination performed by the third mobile device, and information regarding the location of the third mobile device at the time of the disconnection of the third mobile device from the vehicle integration function of the third vehicle during the navigation operation to the first destination performed by the third mobile device; and responsive to a determination that the third location is inside the third geographic boundary: sending information to the third mobile device indicating that the navigation function associated with the first destination performed by the third mobile device should be terminated.

In one embodiment, receiving, from a first mobile device: information indicating disconnection of the first mobile device from a vehicle integration function of a first vehicle during a navigation operation to a first destination performed by the first mobile device, information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and information regarding a first location associated with the first mobile device at the time of the disconnection of the first mobile device from the vehicle integration function of the first vehicle during the navigation operation to the first destination performed by the first mobile device; receiving, from a second mobile device: information indicating disconnection of the second mobile device from a vehicle integration function of a second vehicle during a navigation operation to the first destination performed by the second mobile device, information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and information regarding a second location associated with the second mobile device at the time of the disconnection of the second mobile device from the vehicle integration function of the second vehicle during the navigation operation to the first destination performed by the second mobile device; responsive to a determination that both of: a) the first location associated with the first mobile device at the time of the disconnection of the first mobile device from the vehicle integration function of the first vehicle during the navigation operation to the first destination performed by the first mobile device, and b) the second location associated with the second mobile device at the time of the disconnection of the second mobile device from the vehicle integration function of the second vehicle during the navigation operation to the first destination performed by the second mobile device are outside of a predetermined first geographic boundary associated with the first destination and are inside a predetermined second geographic boundary associated with a location within a predetermined distance of the first destination: generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device; receiving, from a third mobile device, an indication of initiation of a navigation function related to the first destination; and sending, to the third mobile device, information related to the third geographic boundary information.

In some embodiments, the one or more locations related to the first location comprise at least one of: a business, a residence, a facility, a real estate area, a parking area associated with the first location, a parking area associated with a real estate entity associated with the first location, a municipality, an attraction, or a point of interest.

In some embodiments, the server and the location server are implemented on the same computing device.

Another embodiment relates to a mobile device, comprising: a processor, a transmitter, a receiver, a memory for storing instructions for causing the processor, transmitter, and receiver to perform the steps of: performing a first navigation function associated with a first destination while connected to a vehicle integration function of a vehicle, responsive to detecting disconnection of the mobile device from the vehicle integration function of the vehicle during performance of the first navigation function associated with the first destination, performing the steps of: determining a first location associated with the mobile device at the time of the disconnection of the mobile device from the vehicle integration function of the vehicle during performance of the first navigation function associated with the first destination, and sending, from the mobile device: a) information indicating disconnection of the mobile device from the vehicle integration function of the vehicle during performance of the first navigation function associated with the first destination, and b) information regarding the first location associated with the mobile device at the time of the disconnection of the mobile device from the vehicle integration function of the vehicle, receiving, from the server, an indication that the first navigation function associated with the first destination should be terminated, and terminating the first navigation function associated with the first destination.

In some embodiments, the first navigation function associated with the first destination provides driving directions to the user via the vehicle integration function of the vehicle.

In some embodiments, information indicating disconnection of the mobile device from the vehicle integration function of the vehicle during performance of the first navigation function associated with the first destination comprises information indicating disconnection of the mobile device from the vehicle integration function of the vehicle during performance of a navigation function and information indicating the first destination.

In some embodiments, the instructions further comprise instructions for causing the processor, transmitter, and receiver to perform the step of: after terminating the first navigation function associated with the first destination: initiating a second navigation function associated with the first destination, wherein the second navigation function provides walking directions to the user.

In some embodiments, the first location associated with the mobile device at the time of the disconnection of the mobile device from the vehicle integration function of the vehicle is associated with a geographic area associated with the first destination.

In some embodiments, terminating the first navigation function associated with the first destination comprises providing an indication to the user that the user has arrived at the first destination.

In another embodiment, steps performed by a mobile device, comprise: responsive to disconnection of the mobile device from a vehicle integration function of a vehicle, sending, from the mobile device: a) information indicating disconnection of the mobile device from the vehicle integration function of the vehicle, b) information indicating first manual termination of a navigation operation to a first destination after disconnection of the mobile device from the vehicle integration function of the vehicle, and c) information regarding a first location associated with the mobile device at the time of the disconnection of the mobile device from the vehicle integration function of the vehicle.

In some embodiments, the step of sending is responsive to a determination that a second location of the mobile device at the time of the first manual termination of a navigation operation to a first destination is within a predetermined threshold distance from the first location associated with the mobile device at the time of the disconnection of the mobile device from the vehicle integration function of the vehicle.

In some embodiments, the step of sending is responsive to a determination that an elapsed time between the disconnection of the mobile device from a vehicle integration function of a vehicle and the first manual termination of a navigation operation to a first destination after disconnection of the mobile device from the vehicle integration function of the vehicle was below a predetermined threshold time.

In another embodiment, steps performed by a mobile device comprise: receiving, from a mobile device: a) information indicating disconnection of the mobile device from a vehicle integration function of a vehicle, b) information indicating first manual termination of a navigation operation to a first destination after disconnection of the mobile device from the vehicle integration function of the vehicle, and c) information regarding a first location associated with the mobile device at the time of the disconnection of the mobile device from the vehicle integration function of the vehicle, and responsive to the information indicating disconnection of the mobile device from a vehicle integration function of the vehicle, the information indicating first manual termination of a navigation operation to a first destination after disconnection of the mobile device from the vehicle integration function of the vehicle, and a determination that the first location associated with the mobile device at the time of the disconnection of the mobile device from the vehicle integration function of the vehicle is outside of a first geographic boundary associated with the first destination: generating a second geographic boundary associated with the first destination encompassing the first location associated with the mobile device at the time of the disconnection of the mobile device from the vehicle integration function of the vehicle.

In some embodiments, the step of generating a second geographic boundary associated with the first destination encompassing the first location associated with the mobile device at the time of the disconnection of the mobile device from the vehicle integration function of the vehicle is further responsive to: a determination that the first location associated with the mobile device at the time of the disconnection of the mobile device from the vehicle integration function of the vehicle is within a predetermined threshold distance from a location associated with the first destination.

In some embodiments, the step of generating a second geographic boundary associated with the first destination encompassing the first location associated with the mobile device at the time of the disconnection of the mobile device from the vehicle integration function of the vehicle is further responsive to: a determination that the first location associated with the mobile device at the time of the disconnection of the mobile device from the vehicle integration function of the vehicle is associated with a geographic area associated with the first destination.

In some embodiments, the geographic area associated with the first destination is at least one of a parking lot associated with the first destination, a parking lot of a shopping center associated with the first destination, a parking location within a predetermined threshold distance of the first destination, and one of a predetermined number of closest parking locations to the first destination.

In another embodiment, steps performed by a mobile device comprise: performing a first navigation function associated with a first destination, responsive to disconnection of the mobile device from a vehicle integration function of a vehicle during performance of the navigation function associated with the first destination, determining a first location of the mobile device at the time of the disconnection of the mobile device from the vehicle integration function of the vehicle, and responsive to manual termination of the navigation function associated with the first destination after disconnection of the mobile device from the vehicle integration function of the vehicle, sending, to a network device: a) information regarding the first location of the mobile device at the time of the disconnection of the mobile device from the vehicle integration function of the vehicle and b) information regarding the first destination.

In some embodiments, steps performed by a mobile device further comprise: determining a second location of the mobile device at the time of the manual termination of a navigation operation to a first destination, and responsive to manual termination of navigation function associated with the first destination after disconnection of the mobile device from the vehicle integration function of the vehicle, sending, to the network device: c) information regarding the second location of the mobile device at the time of the manual termination of a navigation operation to a first destination.

In another embodiment, steps performed by a server comprise: receiving, from a first mobile device, after disconnection of the first mobile device from a vehicle integration function of a first vehicle, information indicating first manual termination of a navigation operation to a first destination and information regarding a first location associated with the first mobile device at the time of the first manual termination of a navigation function, receiving, from a second mobile device, after disconnection of the second mobile device from a vehicle integration function of a second vehicle, information indicating second manual termination of a navigation operation to the first destination and information regarding the second location associated with the second mobile device at the time of the second manual termination of a navigation function, determining a first geographic boundary information associated with the first destination, and responsive to a determination that at least one of the first location associated with the first mobile device at the time of the first manual termination of navigation or the second location associated with the second mobile device at the time of the second manual termination are outside of the current geographic boundary associated with the first destination: generating second geographic boundary information associated with the first destination encompassing the at least one of the first location associated with the first mobile device at the time of the first manual termination of navigation or the second location associated with the second mobile device at the time of the second manual termination that were determined to be outside of the current geographic boundary associated with the first destination.

In some embodiments, steps performed by a server further comprise: receiving, from a third mobile device, an indication of initiation of a navigation function related to the first destination, and sending, to the third mobile device, information related to the second geographic boundary information. In some embodiments, the first geographic boundary represented by the first geographic boundary information is substantially an area within a first distance from a geographic location associated with the first destination. In some embodiments, the second geographic boundary is an irregular polygon.

In some embodiments, the third mobile device, upon detecting disconnection of the third mobile device from a vehicle integration function of a third vehicle, makes a determination that the third mobile device is at a position inside the second geographic area but outside the first geographic area, terminates a navigation function associated with the first destination. In some embodiments, at least one of the first mobile device, the second mobile device, and the third mobile device are cellular phones.

In another embodiment, steps performed by a mobile device comprise: providing navigation information to a user in response to an indication from the user of a first destination, using first geographic boundary information associated with the first destination to determine whether the user has arrived at the first destination, sending, to a server, after disconnection of the first mobile device from a vehicle integration function of a first vehicle, information indicating first manual termination of a navigation operation to a first destination and information regarding the first location associated with the first mobile device at the time of the first manual termination of a navigation function, receiving, from the server, second geographic boundary information associated with a second destination, and responsive to a subsequent indication from the user of a second destination matching the first destination: using the second geographic boundary information to determine whether the user has arrived at the first destination.

In another embodiment, steps performed by a mobile device comprise: providing navigation information to a user in response to an indication from the user of a first destination, sending, to a server, responsive to disconnection of the first mobile device from a vehicle integration function of a first vehicle: information regarding the first destination and information regarding wireless networks detected in the proximity of the mobile device at the time of the disconnection of the first mobile device from a vehicle integration function of a first vehicle, and receiving, from the server, an indication that navigation to the first destination should be terminated. In some embodiments, the information regarding wireless networks comprises Wi-Fi service set identifiers (SSIDs).

In another embodiment, steps performed by a server comprise: receiving, from a first mobile device: a) information indicating disconnection of the first mobile device from a vehicle integration function of a first vehicle, and b) information regarding wireless network identifiers detected by the first mobile device at the time of the disconnection of the first mobile device from a vehicle integration function of a first vehicle, and responsive to a determination that at least one network identifier indicated by the first information regarding wireless network identifiers detected by the first mobile device at the time of the disconnection of the first mobile device from a vehicle integration function of a first vehicle corresponds to at least one wireless network identifiers associated with the first destination: sending, to the first mobile device, an indication that navigation to the first destination should be terminated.

In another embodiment, steps performed by a mobile device comprise: providing navigation information to a user in response to an indication from the user of a first destination, sending, to a server, responsive to disconnection of the first mobile device from a vehicle integration function of a first vehicle, information regarding the first destination, receiving, from the server, a list of wireless network identifiers associated with the first destination, responsive to a determination that at least one network identifier associated with the first destination matches a network identifier detected by the mobile device at the time of disconnection of the first mobile device from the vehicle integration function of the first vehicle: terminating the navigation function to the first destination.

In some embodiments, steps performed by a mobile device further comprise: detecting disconnection of the mobile device from the vehicle integration function of the vehicle during performance of the first navigation function associated with a first destination, and detecting wireless network identifiers identifiable from wireless signals at the current location.

In another embodiment, steps performed by a mobile device comprise: receiving, from a first mobile device: information indicating first manual termination of a navigation operation to a first destination and first information regarding wireless network identifiers detected by the first mobile device at the time of the first manual termination of the navigation operation to a first destination, receiving, from a first mobile device: information indicating second manual termination of a navigation operation to a first destination and second information regarding wireless network identifiers detected by the second mobile device at the time of the second manual termination of the navigation operation to a first destination, wherein the first information first information regarding wireless network identifiers detected by the first mobile device and the second information regarding wireless network identifiers detected by the second mobile device both include a first common network identifier, and adding the first common network identifier to a list of network identifiers associated with the first destination.

In some embodiments, steps performed by a server further comprise: comparing location information of the mobile device to first geographic boundary information associated with a first destination. In some embodiments, detecting disconnection triggers a change to walking directions if the disconnection is within second geographic boundary.

BRIEF DESCRIPTION OF THE DRAWINGS

The foregoing summary, as well as the following detailed description, is better understood when read in conjunction with the attached drawings. For the purpose of illustrating the system and methods, there is shown in the drawings exemplary constructions thereof; however, the system and methods are not limited to the specific methods and instrumentalities disclosed.

Like reference numbers and designations in the various drawings indicate like elements.

DETAILED DESCRIPTION OF THE PREFERRED EMBODIMENTS

Figure 1:
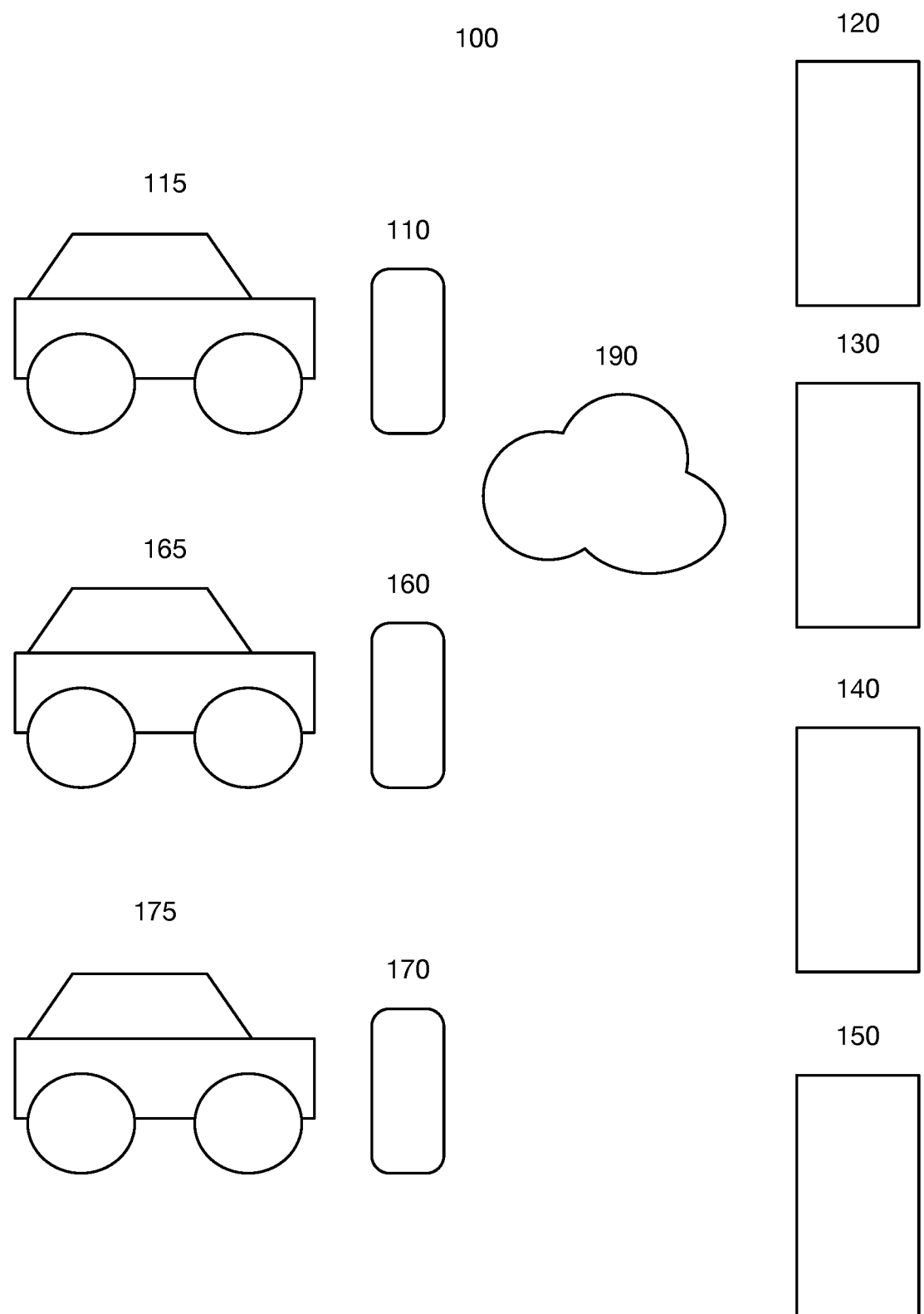
FIG. 1 is an example environment for the system.

FIG. 1 is an example environment for the system. In some implementations, the environment 100 may include mobile devices 110, 160, and 170, which may connect to vehicle integration functions of vehicles 115, 165, and 175. Server 120, location server 130, network database 140, and location database 150 provide various functions related to the navigation termination systems and methods, as described with respect to the figures below. The various devices, vehicles, and servers may communicate with each other directly or via one or more networks or the Internet 190.

Each mobile device may comprise one or more processors, one or more transmitters, one or more receivers, or transmitters and receivers combined as transceivers, one or more memories for storing program instructions or data, and one or more displays. Transmitters, receivers, and transceivers may allow communication over various wired and wireless communications schemes such as USB, Thunderbolt, 3GPP LTE, 3GPP 5G, 3GPP 6G, Wi-Fi, and Bluetooth. Mobile devices may connect to vehicles and the Internet via one or more of the communication schemes. In some embodiments, mobile devices connect to vehicle integration functions of vehicles via USB, Bluetooth, or Wi-Fi.

Examples of vehicle integration functions include Apple CarPlay and Android Auto, as well as various vehicle manufacturer mobile device integration systems. Examples of mobile devices include various versions of the Apple iPhone, various versions of the Samsung Galaxy phone, and numerous other cellular phones from other manufacturers. Examples of vehicles implementing vehicle integration functions include the Ford Mustang Mach-E, the Volvo XC90, and numerous other vehicles. Connection of the mobile device to the vehicle and its vehicle integration function may be via wired or wireless connections. Wired connections may be via USB or other connection types. Wireless connections may be via Wi-Fi, Bluetooth, or other wireless communication methods.

Figure 2:
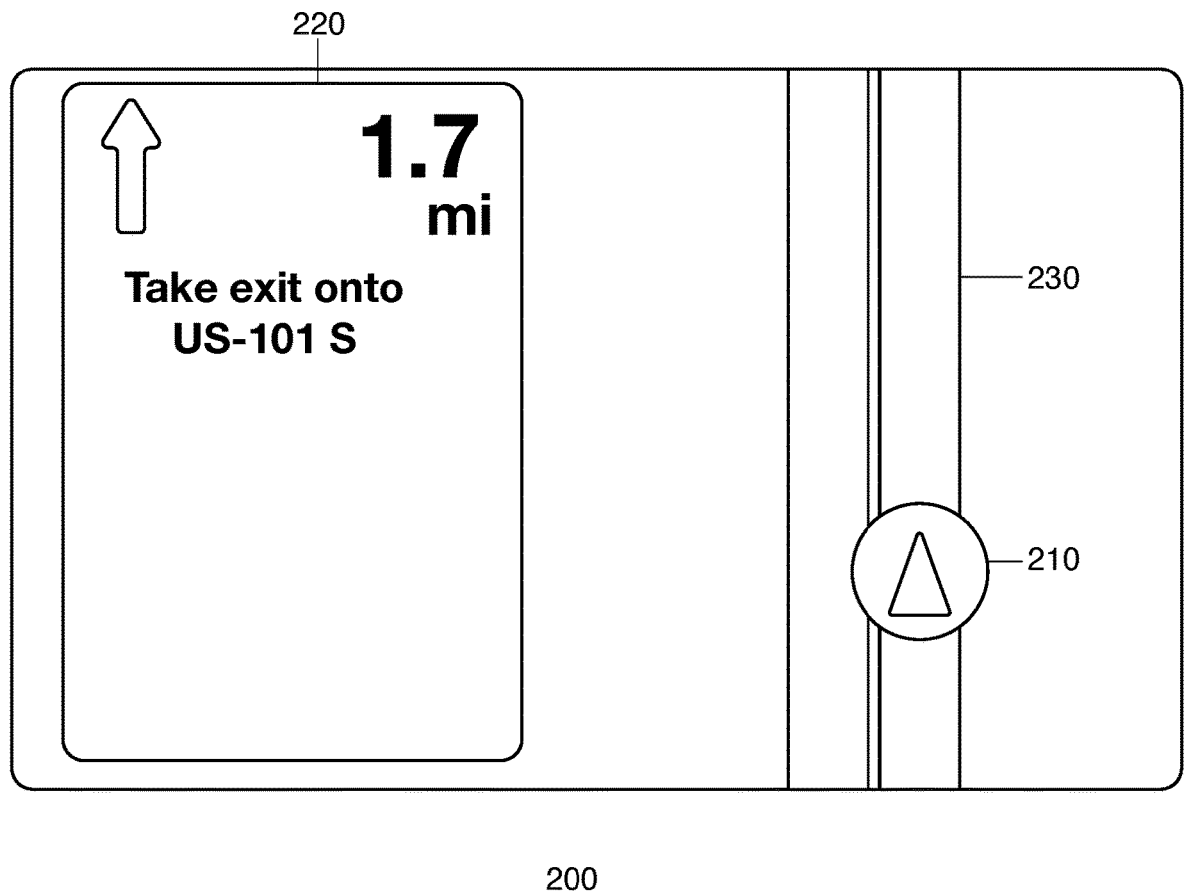
FIG. 2 is a navigation system user interface using a vehicle integration function.

FIG. 2 is a navigation system user interface using a vehicle integration function. The user interface 200 may show an indication of the user's present location 210, navigation instructions 220, and indications of a route 230. The user interface display data may be generated by the mobile device 110 and displayed on a screen of vehicle 115 via the vehicle integration function.

Figure 3:
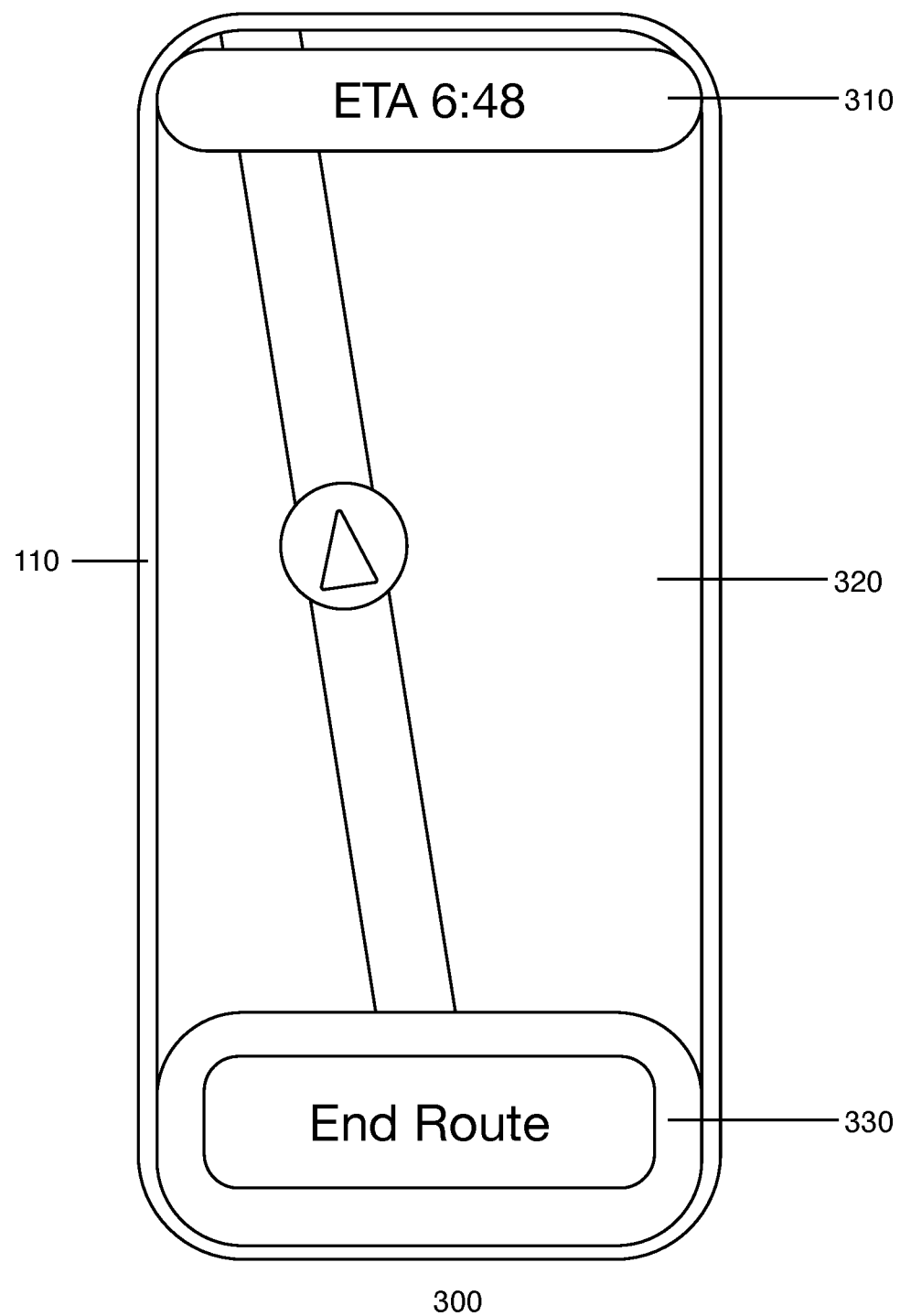
FIG. 3 is a navigation user interface of a mobile device.

FIG. 3 is a navigation user interface of a mobile device. User interface 300 may be displayed, for instance, after disconnection of mobile device 110 from the vehicle integration function of vehicle 115. User interface 300 may include navigation information 10, map display 320, and navigation function controls such as button 330 for terminating navigation.

Figure 4:
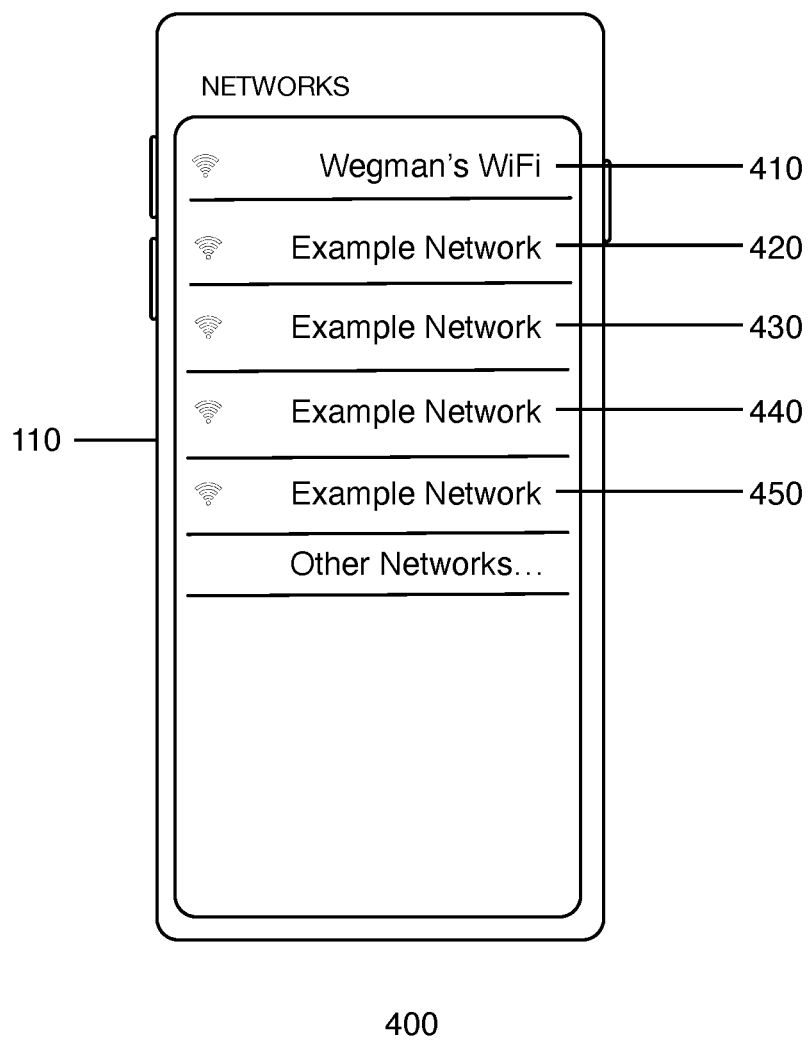
FIG. 4 is a diagram showing a user interface listing detected wireless network identifiers.

FIG. 4 is a diagram showing a user interface listing detected wireless network identifiers. Mobile devices, such as mobile device 110, also generally have the capability of detecting wireless networks in their proximity. Mobile device 110, using one or more appropriate receivers or transceivers for one or more wireless communication standards, may detect the presence of wireless signals and indications of wireless network identifiers, such as examples 410, 420, 430, 440, and 450, and present them in a user interface 400. A user interface such as interface 400 will generally not be displayed in the operation of the processes described below, but is provided as an illustrative example of a capability of mobile devices to determine wireless network identifiers.

Figure 5:
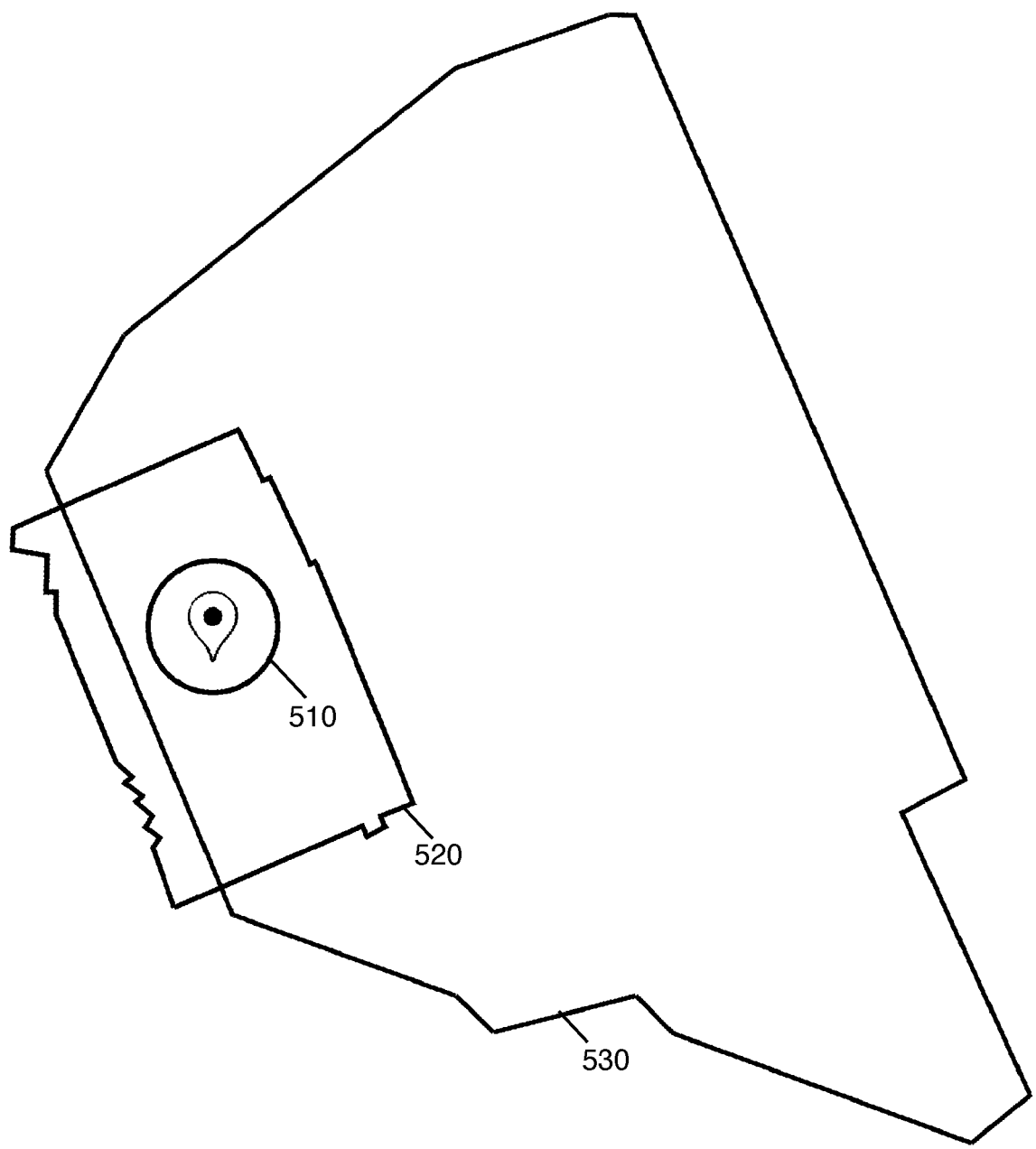
FIG. 5 is a diagram of an example destination.

FIG. 5 is a diagram of an example destination. An area 510 may be considered to be the destination by the navigation system. The actual destination may be a larger area 520, such as a building. Still another area 530, such as a parking lot, may be considered as part of the destination by the user, but not by the navigation system. These mismatches may lead to unwanted continuation of navigation function by a mobile device, though users may consider themselves to have arrived.

Figure 6:
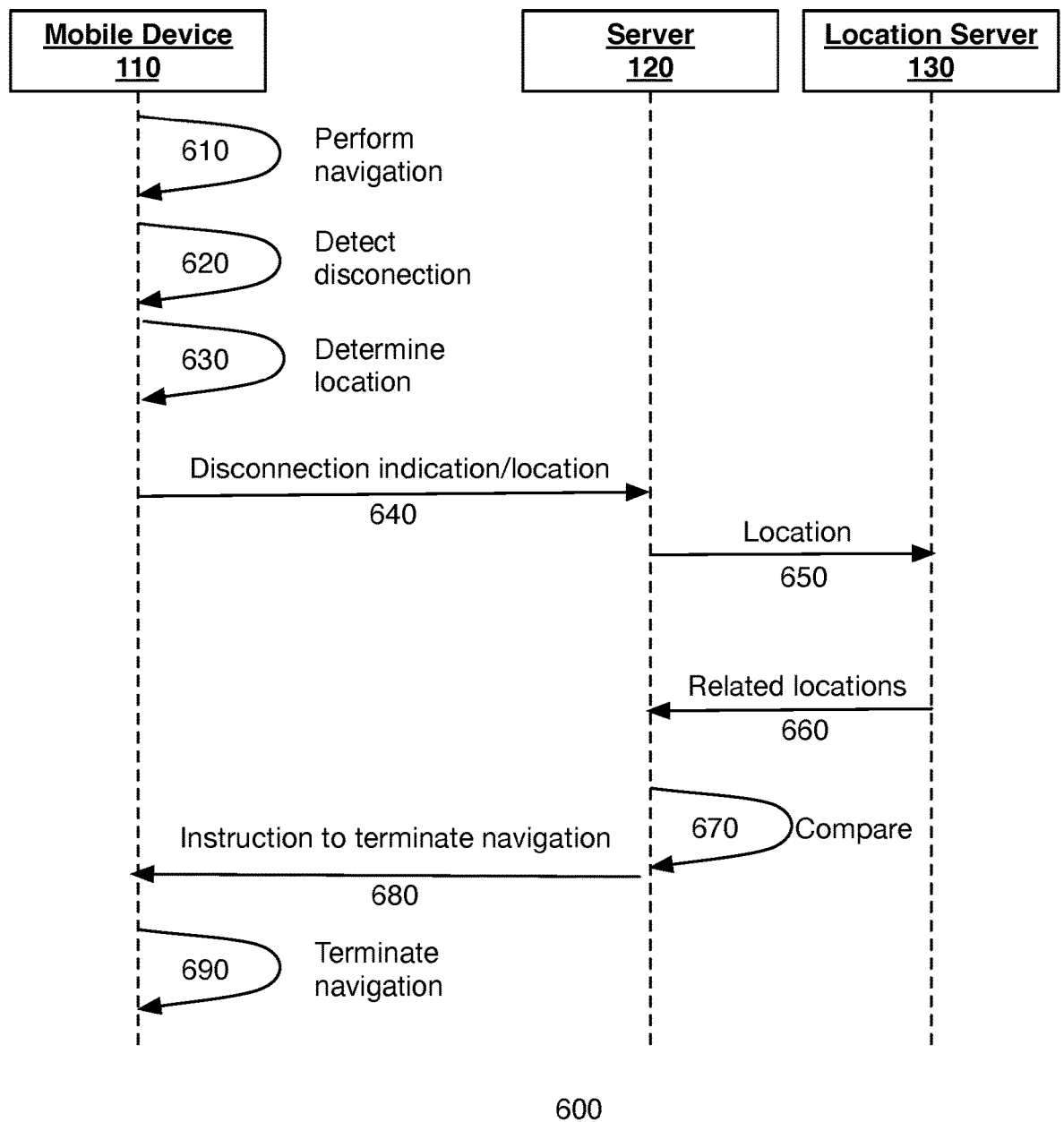
FIG. 6 is a sequence diagram of an example process for navigation termination.

FIG. 6 is a sequence diagram of an example process for navigation termination. When disconnecting from a vehicle integration function during active navigation, the mobile device should be able to determine whether the disconnection occurred in a location associated with the specified destination. For example, an associated location might be an associated parking lot, or, if the location is in a mall, the surrounding parking lots of the mall. Associated locations could be determined at various times, including upon disconnection during navigation to the destination or upon initiation of navigation to the destination.

At step 610 of process 600, mobile device 110 performs a navigation function related to a first destination for the user. In a preferred embodiment, the navigation function is performed while the mobile device is connected to a vehicle integration function of a vehicle 115. A user interface may be presented to the user via a vehicle display, as shown in the example of FIG. 2.

At step 620, mobile device 110 detects that the mobile device 110 has been disconnected from the vehicle integration function of vehicle 115. At step 630, mobile device 110 determines the location of mobile device 110 at the time of the disconnection. At step 640, mobile device 110 sends the disconnection indication and location to the server 120.

Optionally, at step 650, server 120 sends the determined location of mobile device 110 at the time of disconnection to location server 130. At step 660, location server 130 sends information regarding one or more locations related to the user's destination to server 120. At step 670, server 120 compares the disconnection location of the user to the information regarding one or more locations related to the destination. Upon detecting an overlap in the locations, at step 680, server 120 will send an instruction to terminate navigation to mobile device 110. At step 690, mobile device 110 will terminate navigation.

Figure 7:
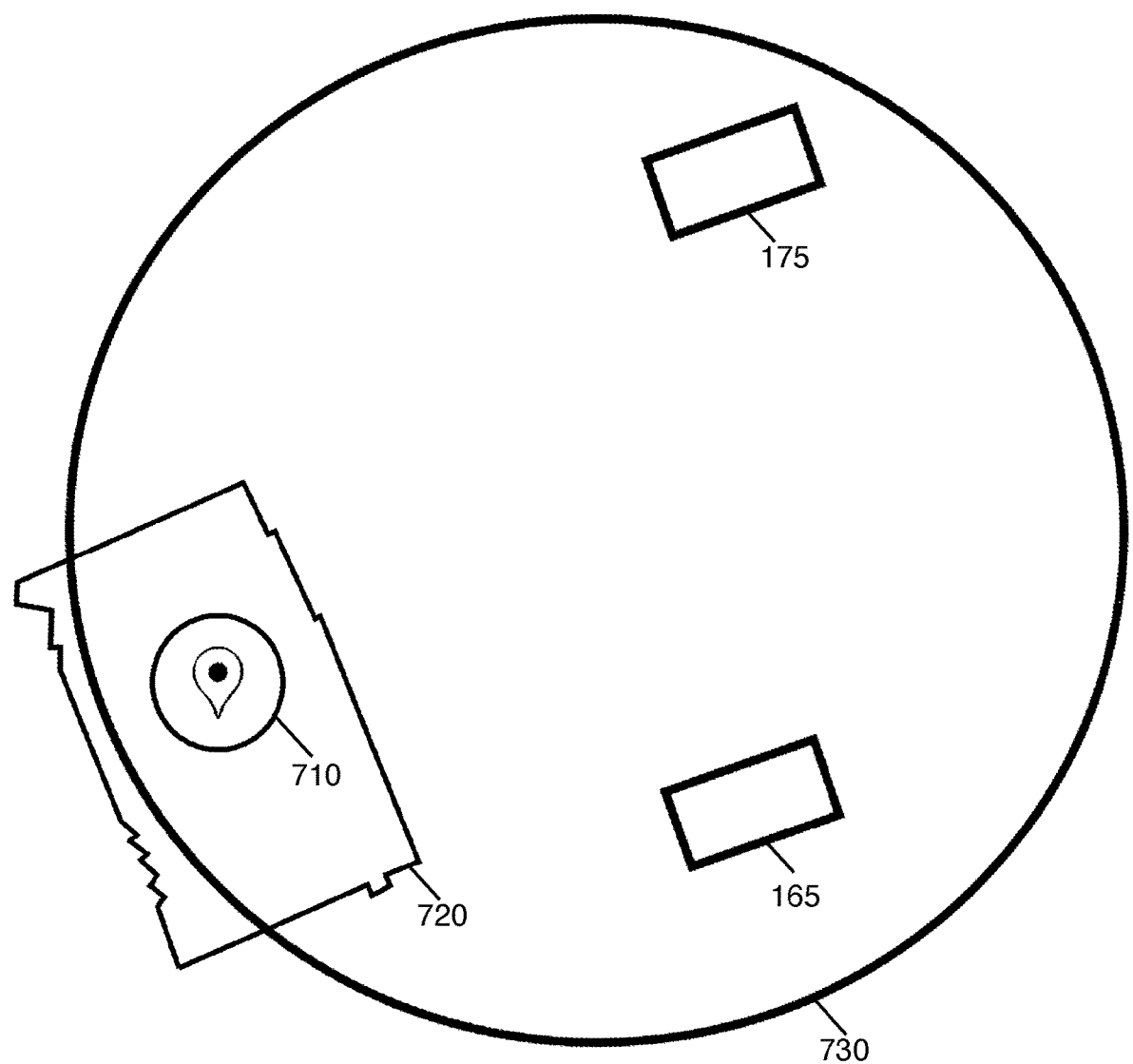
FIG. 7 is a diagram of changing boundaries associated with an example destination.

FIG. 7 is a diagram of changing boundaries associated with an example destination. A process by which the boundary associated with a destination may change is described below with regard to FIG. 8. An initial area 710 is associated with the destination 720 by the navigation system. However, with detected disconnections of mobile devices from vehicle integration functions of vehicles 165 and 175 during navigation to destination 720, the navigation system may update the area associated with destination 720 to a new area 730 that encompasses the locations of disconnection from vehicle integration functions of vehicles 165 and 175.

Figure 8:
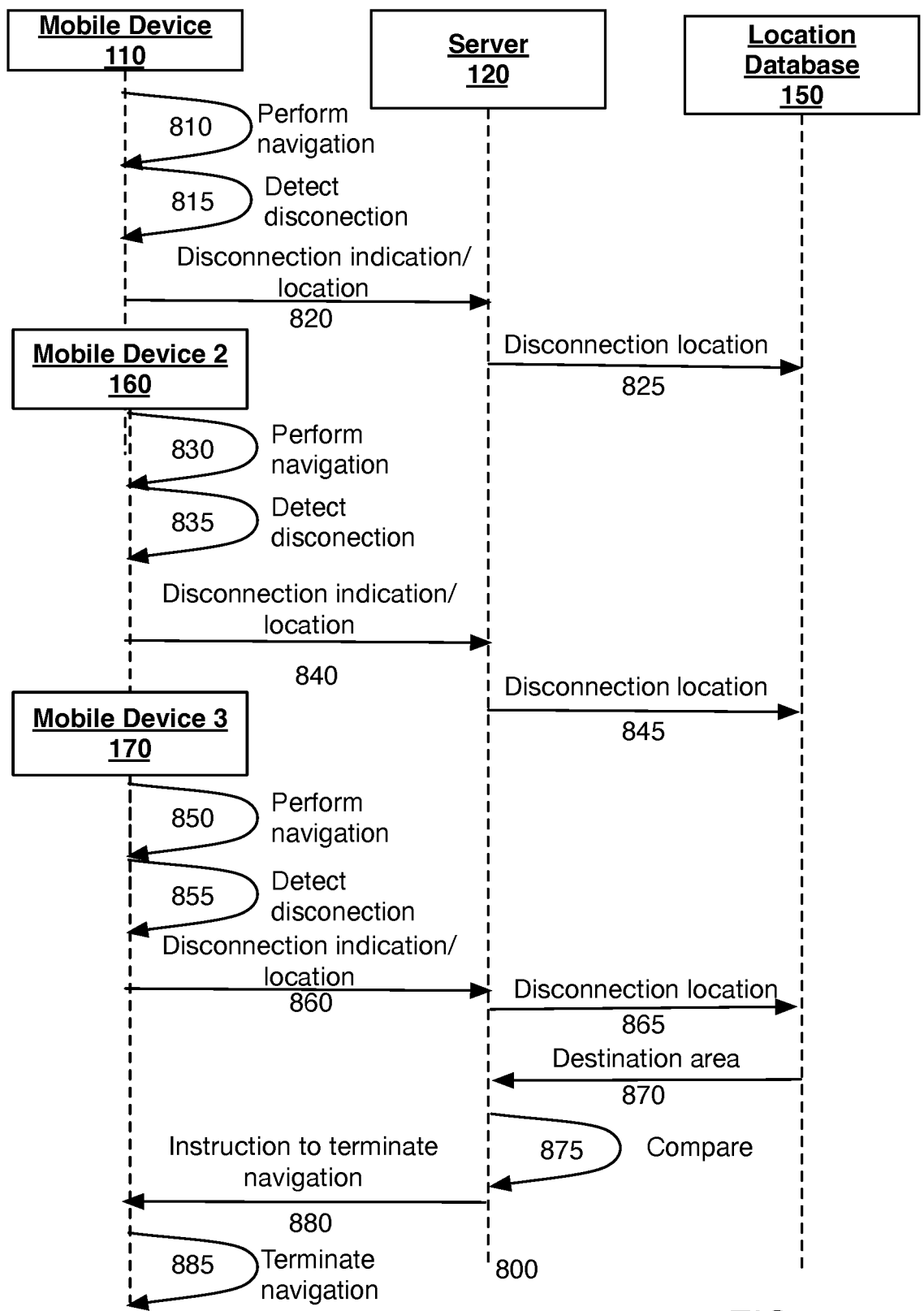
FIG. 8 is a sequence diagram of a process for changing the boundaries associated with an example destination.

FIG. 8 is a sequence diagram of a process for changing the boundaries associated with an example destination. A way to determine a new boundary associated with a navigation destination is to monitor locations where mobile devices are disconnecting from vehicle integration functions followed by manual termination of navigation. These disconnection locations can be used to adapt the boundary that the navigation system considers the navigation destination. In some embodiments, the new boundary encompasses the vehicle integration disconnection points. In some embodiments, the new boundary encompasses the points at which navigation was manually terminated, possibly also including additional outside areas. The additional outside areas may account for delay in realization by the user that navigation has undesirably continued.

In some cases, added areas may encompass geographic or real estate areas associated with the points of disconnection. For instance, in some situations, parking will not be available near the navigation destination. Disconnection of a mobile device performing navigation to a particular destination while the mobile device is in a parking garage, for instance, may result in the addition of that parking garage to the area considered as part of the navigation destination for navigation termination purposes.

At step 810 of process 800, mobile device 110 performs a navigation function related to a first destination for the user. In a preferred embodiment, the navigation function is performed while the mobile device is connected to a vehicle integration function of a vehicle 115. A user interface may be presented to the user via a vehicle display, as shown in the example of FIG. 2. At step 815, mobile device 110 detects that the mobile device 110 has been disconnected from the vehicle integration function of vehicle 115. At step 820, mobile device 110 sends a disconnection indication and location to server 120. Mobile device 110 may further send an indication of manual termination of the navigation function after the disconnection. Optionally, at step 825, server 120 sends the disconnection location to the location database 150.

At step 835, mobile device 2 160 detects that the mobile device has been disconnected from Vehicle 165. At step 840, mobile device 2 160 sends a disconnection indication and location to server 120. Mobile device 2 160 may further send an indication of manual termination of the navigation function after the disconnection. Optionally, at step 845, server 120 sends a disconnection location to location database 150.

At step 855, mobile device 3 170 detects that the mobile device 3 170 has been disconnected from the vehicle integration function of vehicle 175. At step 860, mobile device 3 170 sends a disconnection indication and location to server 120. Optionally, at step 865, server 120 sends the disconnection location to location database 150 and at step 870, location database sends an updated area it has determined as associated with the destination based at least in part on the locations of disconnection it received from mobile device 110 and mobile device 2 160. At step 875, server 120 compares the disconnection location from step 860 and the destination area from step 870. Upon detecting an overlap in the disconnection location and destination area, at step 880, server 120 will send instruction to terminate navigation to mobile device 3 170. At step 885, mobile device 3 will terminate navigation.

Figure 9:
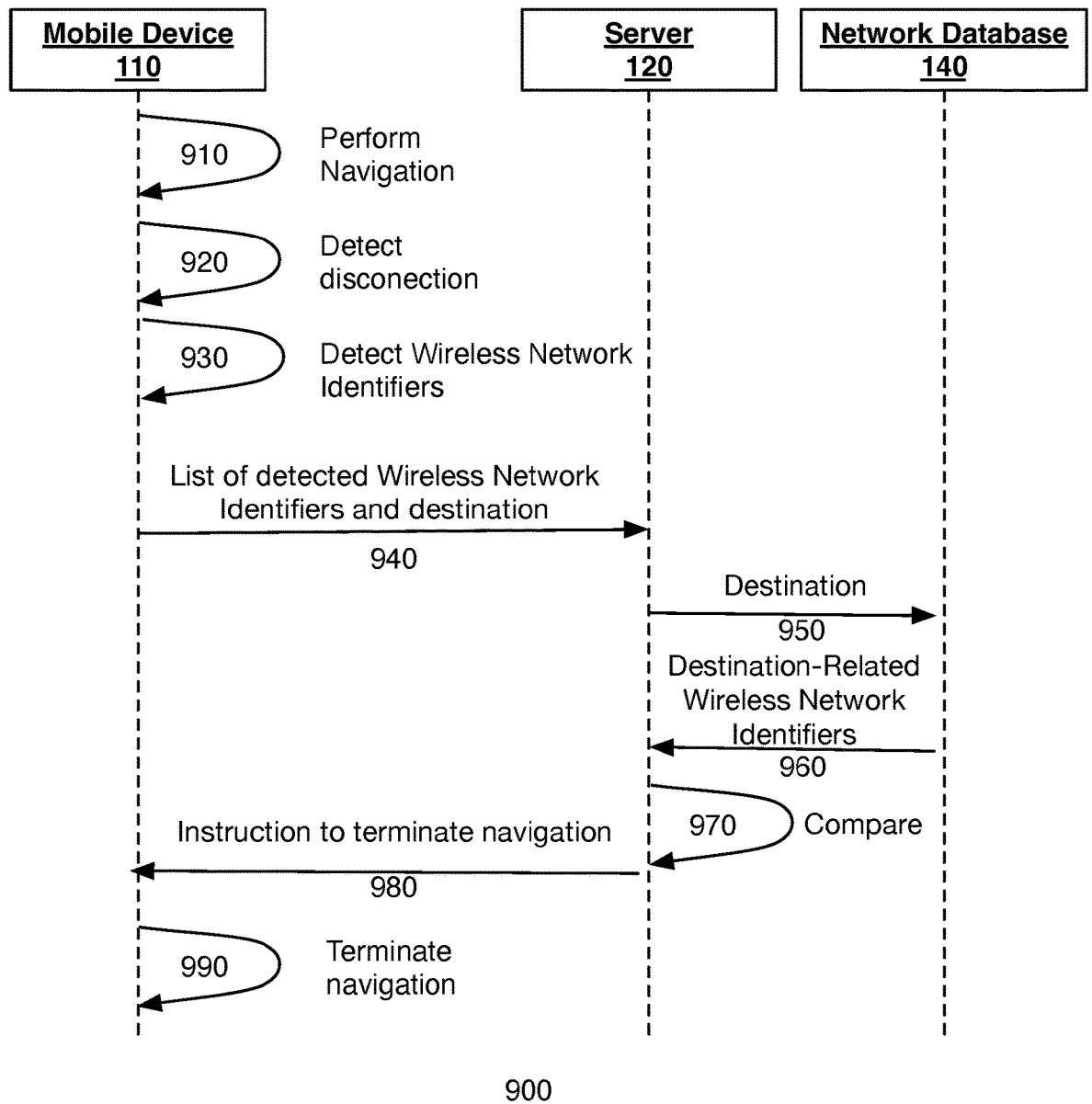
FIG. 9 is a sequence diagram of an example process for terminating navigation based on detected networks.

FIG. 9 is a sequence diagram of an example process for terminating navigation based on detected networks. Wireless network identifiers detectable at the time of disconnection of the mobile device from the vehicle integration function can serve as additional clues as to whether the user's destination has effectively been reached, even if the navigation system has not yet acknowledged arrival. When the user disconnects his or her mobile device from the vehicle integration function, the phone may check for, for instance, available Wi-Fi network SSIDs.

In one embodiment, the mobile device may send a list of network identifiers detected at the time of disconnection from the vehicle integration function to a server and the server may check to see if those network identifiers relate to the destination. The server may then inform the mobile device that the destination has effectively been reached and/or instruct the mobile device to terminate the navigation function to the destination based on that determination.

At step 910 of process 900, mobile device 110 performs a navigation function related to a first destination for the user. In a preferred embodiment, the navigation function is performed while the mobile device is connected to a vehicle integration function of a vehicle 115. A user interface may be presented to the user via a vehicle display, as shown in the example of FIG. 2. At step 920, mobile device 110 detects that the mobile device has been disconnected from the vehicle integration function of vehicle 115. At step 930, mobile device 110 detects wireless network identifiers detectable at the location of disconnection. At step 940, mobile device 110 sends a list of detected wireless network identifiers and an indication of the navigation destination to server 120. Optionally, at step 950, server 120 then either sends a request for destination-related network identifiers to the network database 140. At step 960 the network database 140 returns destination-related network identifiers. Wireless network identifier information may be sent as textual data, hashed textual data, or otherwise coded or by reference.

At step 970 the server 120 compares the detected wireless network identifiers to destination-related network identifiers. Upon detecting a match between one or more of the detected wireless network identifiers from step 930 with one or more destination-related wireless network identifiers, at step 980, the server 120 sends instruction to terminate navigation to mobile device 110. At step 990, mobile device 110 terminates navigation associated with the first destination.

Figure 10:
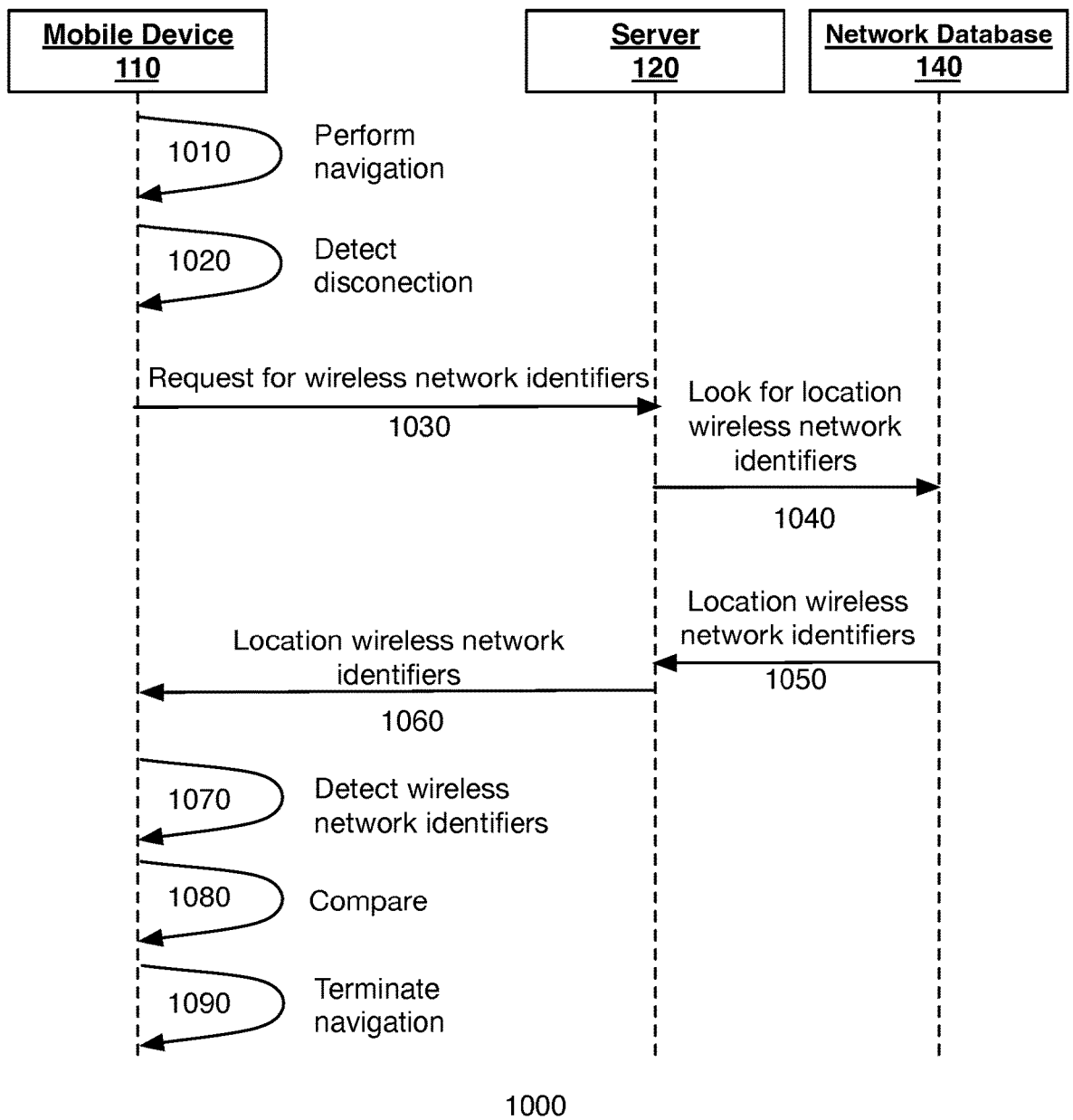
FIG. 10 is a sequence diagram of another example process for terminating navigation based on detected networks.

FIG. 10 is a sequence diagram of another example process for terminating navigation based on detected networks. As an alternative to server-side comparison of detected and destination-related wireless network identifiers, comparison may also be made at the mobile device 110.

At step 1010 of process 1000, mobile device 110 performs a navigation function related to a first destination for the user. In a preferred embodiment, the navigation function is performed while the mobile device is connected to a vehicle integration function of a vehicle 115. A user interface may be presented to the user via a vehicle display, as shown in the example of FIG. 2.

At step 1020, mobile device 110 detects that the mobile device has been disconnected from the vehicle integration function of vehicle 115. At step 1030, mobile device 110 sends a request for wireless network identifiers associated with the first destination to server 120. Server 120 then may optionally send a request for wireless network identifiers to a network database 140 at step 1040 and receive a response with wireless network identifier information at step 1050. Alternatively, server 120 may itself be able to store and retrieve the relevant wireless network identifier information. At step 1060, server 120 returns destination-related wireless network identifier information to mobile device 110. Wireless network identifier information may be sent as textual data, hashed textual data, or otherwise coded or by reference.

At step 1070, mobile device 110 detects wireless signals to determine wireless network identifier information associated with wireless signals at the current location. At step 1080, mobile device 110 compares the detected wireless network identifier information with the destination-related wireless network identifier information received at step 1060 from server 120. Upon detecting a match between one or more of the detected wireless network identifiers from step 1070 with one or more of the indicated wireless network identifiers from step 1060, mobile device 110 terminates the navigation function associated with the first destination at step 1090.

It should be noted that the steps of process 1000 may be performed in different orders. For example, detection of wireless network identifiers associated with the current location may be performed after detection of disconnection of mobile device 110 from the vehicle integration function of vehicle 115 and before mobile device makes the request to server 120 for wireless network identifiers relevant to the first destination. Further, the steps of requesting 1030 and receiving 1060 network identifiers from the server 120 may occur around the time of initiation of the performance of the navigation function to the first destination.

Figure 11:
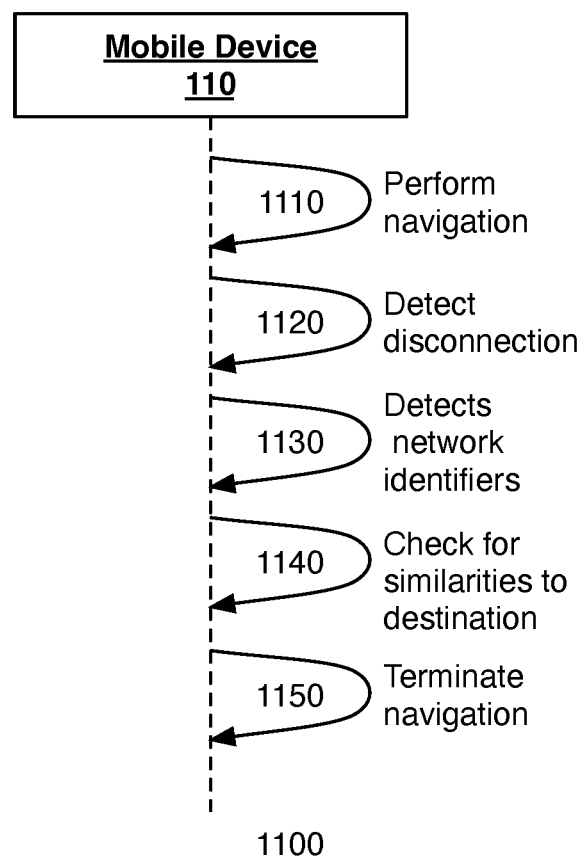
FIG. 11 is a sequence diagram of another example process for terminating navigation based on detected networks.

FIG. 11 is a sequence diagram of another example process for terminating navigation based on detected networks. In addition to comparisons of detected network identifiers to lists of known associated network identifiers, determinations of proximity to a destination might also be made through inspection of the network identifiers themselves. It is a common practice of many entities to name their wireless networks with some indication of the name of the entity. For instance, Wegmans Supermarket might use the string "wegmans" in a network identifier, such as a Wi-Fi SSID. In some embodiments, the mobile device may scan network identifiers at the time of disconnection from a vehicle integration function for text strings associated with the current destination of the navigation function. In the event of a match, the mobile device itself may decide the destination has effectively been reached and the navigation function may be terminated.

At step 1110 of process 1100, mobile device 110 performs a navigation function related to a first destination for the user. In a preferred embodiment, the navigation function is performed while the mobile device is connected to a vehicle integration function of a vehicle 115. A user interface may be presented to the user via a vehicle display, as shown in the example of FIG. 2.

At step 1120, mobile device 110 detects that the mobile device has been disconnected from the vehicle integration function of vehicle 115. At step 1130, mobile device 110 detects wireless network identifiers detectable at the time of disconnection from the vehicle integration function. At step 1140, mobile device 110 checks for similarities in the detected wireless network identifiers to text strings related to the destination. Upon detecting similarities, at step 1150, mobile device 110 will terminate navigation.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

I claim:

1. A method for assisting termination of a navigation operation, comprising:
   receiving, from a first mobile device:
      information indicating disconnection of the first mobile device from a vehicle integration function of a first vehicle during a navigation operation to a first destination performed by the first mobile device,
      information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and
      information regarding a first location associated with the first mobile device at the time of the disconnection of the first mobile device from the vehicle integration function of the first vehicle during the navigation operation to the first destination performed by the first mobile device;
   receiving, from a second mobile device:
      information indicating disconnection of the second mobile device from a vehicle integration function of a second vehicle during a navigation operation to the first destination performed by the second mobile device,
      information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and
      information regarding a second location associated with the second mobile device at the time of the disconnection of the second mobile device from the vehicle integration function of the second vehicle during the navigation operation to the first destination performed by the second mobile device;
   responsive to a determination that both of:
      a) the first location associated with the first mobile device at the time of the disconnection of the first mobile device from the vehicle integration function of the first vehicle during the navigation operation to the first destination performed by the first mobile device, and
      b) the second location associated with the second mobile device at the time of the disconnection of the second mobile device from the vehicle integration function of the second vehicle during the navigation operation to the first destination performed by the second mobile device
   are outside of a predetermined first geographic boundary associated with the first destination and are inside a predetermined second geographic boundary associated with a location within a predetermined distance of the first destination:
      generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device;
   receiving, from a third mobile device:
      information indicating disconnection of the third mobile device from a vehicle integration function of a third vehicle during a navigation operation to the first destination performed by the third mobile device, and
      information regarding the location of the third mobile device at the time of the disconnection of the third mobile device from the vehicle integration function of the third vehicle during the navigation operation to the first destination performed by the third mobile device; and
   responsive to a determination that the third location is inside the third geographic boundary:
      sending information to the third mobile device indicating that the navigation function associated with the first destination performed by the third mobile device should be terminated.

2. The method of claim 1, wherein at least one of the first mobile device, the second mobile device, and the third mobile device are cellular phones.

3. The method of claim 1, wherein the vehicle integration functions are one of Apple CarPlay or Android Auto functionality of the vehicle.

4. The method of claim 1, wherein the third location is inside the third geographic boundary but outside the first geographic boundary.

5. The method of claim 1, wherein information indicating manual termination of a navigation operation comprises information regarding the destination associated with the navigation operation.

6. The method of claim 1, wherein the location within a predetermined distance of the first destination comprises at least one of: a business, a residence, a facility, a real estate area, a parking area associated with the first location, a parking area associated with a real estate entity associated with the first location, a municipality, an attraction, or a point of interest.

7. The method of claim 1, further comprising the steps of:
sending, to a location server, information regarding a location associated with a mobile device at the time of the disconnection of the mobile device from a vehicle integration function of a vehicle, and
receiving, from the location server, information regarding one or more locations within a predetermined distance of the first destination.

8. The method of claim 1, wherein any of the first, second, or third geographic boundaries are irregular polygons.

9. A navigation management server system, comprising:
a processor,
a transmitter,
a receiver,
a memory for storing instructions for causing the processor, transmitter, and receiver to perform the steps of:
receiving, from a first mobile device:
information indicating disconnection of the first mobile device from a vehicle integration function of a first vehicle during a navigation operation to a first destination performed by the first mobile device,
information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and
information regarding a first location associated with the first mobile device at the time of the disconnection of the first mobile device from the vehicle integration function of the first vehicle during the navigation operation to the first destination performed by the first mobile device;
receiving, from a second mobile device:
information indicating disconnection of the second mobile device from a vehicle integration function of a second vehicle during a navigation operation to the first destination performed by the second mobile device,
information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and
information regarding a second location associated with the second mobile device at the time of the disconnection of the second mobile device from the vehicle integration function of the second vehicle during the navigation operation to the first destination performed by the second mobile device;
responsive to a determination that both of:
a) the first location associated with the first mobile device at the time of the disconnection of the first mobile device from the vehicle integration function of the first vehicle during the navigation operation to the first destination performed by the first mobile device, and
b) the second location associated with the second mobile device at the time of the disconnection of the second mobile device from the vehicle integration function of the second vehicle during the navigation operation to the first destination performed by the second mobile device
are outside of a predetermined first geographic boundary associated with the first destination and are inside a predetermined second geographic boundary associated with a location within a predetermined distance of the first destination:
generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device;
receiving, from a third mobile device:
information indicating disconnection of the third mobile device from a vehicle integration function of a third vehicle during a navigation operation to the first destination performed by the third mobile device, and
information regarding the location of the third mobile device at the time of the disconnection of the third mobile device from the vehicle integration function of the third vehicle during the navigation operation to the first destination performed by the third mobile device; and
responsive to a determination that the third location is inside the third geographic boundary:
sending information to the third mobile device indicating that the navigation function associated with the first destination performed by the third mobile device should be terminated.

10. The navigation management server system of claim 9, wherein at least one of the first mobile device, the second mobile device, and the third mobile device are cellular phones.

11. The navigation management server system of claim 9, wherein the vehicle integration functions are one of Apple CarPlay or Android Auto functionality of the vehicle.

12. The navigation management server system of claim 9, wherein the third location is inside the third geographic boundary but outside the first geographic boundary.

13. The navigation management server system of claim 9, wherein information indicating manual termination of a navigation operation comprises information regarding the destination associated with the navigation operation.

14. The navigation management server system of claim 9, wherein the location within a predetermined distance of the first destination comprises at least one of: a business, a residence, a facility, a real estate area, a parking area associated with the first location, a parking area associated with a real estate entity associated with the first location, a municipality, an attraction, or a point of interest.

15. The navigation management server system of claim 9, further comprising the steps of:
sending, to a location server, information regarding a location associated with a mobile device at the time of the disconnection of the mobile device from a vehicle integration function of a vehicle, and receiving, from the location server, information regarding one or more locations within a predetermined distance of the first destination.

16. The navigation management server system of claim 9, wherein the navigation management server and the location server are implemented on the same computing device.

17. A method for assisting a navigation operation, comprising:

receiving, from a first mobile device:
information indicating disconnection of the first mobile device from a vehicle integration function of a first vehicle during a navigation operation to a first destination performed by the first mobile device,
information indicating first manual termination of the navigation operation to the first destination performed by the first mobile device, the first manual termination having occurred after disconnection of the first mobile device from the vehicle integration function of the first vehicle during the navigation operation to the first destination performed by the first mobile device, and
information regarding a first location associated with the first mobile device at the time of the disconnection of the first mobile device from the vehicle integration function of the first vehicle during the navigation operation to the first destination performed by the first mobile device;

receiving, from a second mobile device:
information indicating disconnection of the second mobile device from a vehicle integration function of a second vehicle during a navigation operation to the first destination performed by the second mobile device,
information indicating second manual termination of the navigation operation to the first destination performed by the second mobile device, the second manual termination having occurred after disconnection of the second mobile device from the vehicle integration function of the second vehicle during the navigation operation to the first destination performed by the second mobile device, and
information regarding a second location associated with the second mobile device at the time of the disconnection of the second mobile device from the vehicle integration function of the second vehicle during the navigation operation to the first destination performed by the second mobile device;

responsive to a determination that both of:
a) the first location associated with the first mobile device at the time of the disconnection of the first mobile device from the vehicle integration function of the first vehicle during the navigation operation to the first destination performed by the first mobile device, and
b) the second location associated with the second mobile device at the time of the disconnection of the second mobile device from the vehicle integration function of the second vehicle during the navigation operation to the first destination performed by the second mobile device are outside of a predetermined first geographic boundary associated with the first destination and are inside a predetermined second geographic boundary associated with a location within a predetermined distance of the first destination:

generating information regarding a third geographic boundary to be associated with the first destination, the third geographic boundary encompassing at least one of the first location associated with the first mobile device at the time of the disconnection of the first mobile device from the vehicle integration function of the first vehicle during the navigation operation to the first destination performed by the first mobile device or the second location associated with the second mobile device at the time of the disconnection of the second mobile device from the vehicle integration function of the second vehicle during the navigation operation to the first destination performed by the second mobile device;

receiving, from a third mobile device, an indication of initiation of a navigation function related to the first destination; and sending, to the third mobile device, information related to the third geographic boundary information.

18. The method of claim 17, wherein the location within a predetermined distance of the first destination comprises at least one of: a business, a residence, a facility, a real estate area, a parking area associated with the first location, a parking area associated with a real estate entity associated with the first location, a municipality, an attraction, or a point of interest.

19. The method of claim 17, further comprising the steps of:

sending, to a location server, information regarding a location associated with a mobile device at the time of the disconnection of the mobile device from a vehicle integration function of a vehicle, and receiving, from the location server, information regarding one or more locations within a predetermined distance of the first destination.

20. The method of claim 17, wherein the third location is inside the third geographic boundary but outside the first geographic boundary.

* * * * *